US008077758B2

(12) United States Patent
Goldberg

(10) Patent No.: US 8,077,758 B2
(45) Date of Patent: Dec. 13, 2011

(54) SIGNAL SEPARATION TECHNIQUES TO PROVIDE ROBUST SPREAD SPECTRUM SIGNAL DECODING

(75) Inventor: Steven J. Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 822 days.

(21) Appl. No.: 11/333,011

(22) Filed: Jan. 17, 2006

(65) Prior Publication Data

US 2006/0176939 A1 Aug. 10, 2006

Related U.S. Application Data

(60) Provisional application No. 60/651,606, filed on Feb. 10, 2005.

(51) Int. Cl.
*H04B 1/00* (2006.01)
*H04K 1/10* (2006.01)
*H03F 1/26* (2006.01)
(52) U.S. Cl. ............... 375/148; 375/260; 702/189
(58) Field of Classification Search ............... 375/148, 375/260; 702/189
See application file for complete search history.

(56) References Cited

U.S. PATENT DOCUMENTS

| 6,842,478 | B1 * | 1/2005 | Ogino | 375/147 |
|---|---|---|---|---|
| 2003/0012262 | A1 * | 1/2003 | Ribeiro Dias et al. | 375/147 |
| 2003/0020651 | A1 | 1/2003 | Crilly, Jr. et al. | 342/378 |
| 2003/0031234 | A1 * | 2/2003 | Smee et al. | 375/147 |
| 2003/0035491 | A1 * | 2/2003 | Walton et al. | 375/267 |
| 2003/0036359 | A1 * | 2/2003 | Dent et al. | 455/63 |
| 2004/0097204 | A1 * | 5/2004 | Jung et al. | 455/132 |
| 2004/0204922 | A1 * | 10/2004 | Beadle et al. | 702/189 |
| 2007/0248175 | A1 * | 10/2007 | Bruninghaus et al. | 375/260 |

FOREIGN PATENT DOCUMENTS

| JP | 2002-243823 | 8/2002 |
|---|---|---|
| TW | M246903 | 10/2004 |
| WO | 03/083991 | 10/2003 |

OTHER PUBLICATIONS

Ristaniemi et al., Jammer Cancellation in DS-CDMA Arrays: Pre and Post Switching of ICA and Rake, IEEE Int. Symposium on Neural Networks for Signal Processing (NNSP 2002), Sep. 2002.

* cited by examiner

*Primary Examiner* — Sarah Hassan
(74) *Attorney, Agent, or Firm* — Allen, Dyer, Doppelt, Milbrath & Gilchrist, P.A.

(57) ABSTRACT

A spread spectrum communications system includes an antenna array for receiving different summations of desired and undesired signals, and receivers are coupled to the antenna array. Each receiver operates based upon a respective channel code for de-spreading the desired and undesired signals for determining at least one desired signal associated with the respective channel code, and for combining the at least one desired signal and the undesired signals after the de-spreading. A processor is coupled to the receivers for forming a mixing matrix based upon the combined signals from each receiver, with entries on a diagonal of the mixing matrix corresponding to the desired signals and entries adjacent the diagonal corresponding to the undesired signals. The processor also processes the mixing matrix so that a level of the desired signals increases and a level of the undesired signals decreases. A demodulator is coupled to the processor for demodulating at least one desired signal.

31 Claims, 5 Drawing Sheets

SIGNAL SEPARATION TECHNIQUES TO PROVIDE ROBUST SPREAD SPECTRUM SIGNAL DECODING

RELATED APPLICATION

This application claims the benefit of U.S. Provisional Application Ser. No. 60/651,606 filed Feb. 10, 2005, the entire contents of which are incorporated herein by reference.

FIELD OF THE INVENTION

The present invention relates to the field of communications, and more particularly, to a spread spectrum communications receiver.

BACKGROUND OF THE INVENTION

Spread spectrum communications techniques have found wide application in wireless communications networks. The main characteristic of these techniques is that the channel is subdivided into data streams via orthogonal codes. In the ideal situation during signal reception the desired signal has perfect correlation with itself and zero correlation with all other signals, including time delayed versions of itself. After passing through a de-spreader, the signal would be recovered having been disturbed only by random noise:

$x_k = a s_k + n.$

In real environments, however, the signals are subject to channel distortion and timing imperfections due to multiple path propagation causing intermixing, which in turn decreases the orthogonality of the signals. The de-spread signal ends up with mixed components of the other signals as well as the desired one:

$$x_k = \sum_{j=1}^{n} a_{kj} s_j + n$$

where the term $a_{kk} s_k$ is the desired signal and the other terms are interference:

$x_k = a_{kk} s_k + n_1 + n$ where $n_1$ is the noise due to the interferers.

Currently, the de-spread signal is processed to determine the symbols with the extraneous terms acting as additional noise. This degrades the result leading to a potential undesirable error rate. High error rates require the use of techniques to provide an adequate integrity to the data stream.

One approach is to increase the use of error correcting codes, which decreases the effective data rate of the link. Another approach is to decrease the symbol rate, which also decreases the effective data rate of the link. Yet another approach is to use negative acknowledgment when the errors exceed the correction capability of the coding, which again decreases the data rate of the link. Other approaches exploit multipath either via MIMO or diversity techniques, which require more complicated circuitry and processing at both the transmitter and the receiver.

The above approaches thus tend to either decrease the data rate of the link, or require more complicated implementations at both the transmitter and the receiver. Moreover, requiring implementation at both the transmitter and receiver usually requires standardization, and this leads to incompatibilities with existing radio access networks.

SUMMARY OF THE INVENTION

In view of the foregoing background, it is therefore an object of the present invention to improve the decoding process for spread spectrum signals.

This and other objects, features, and advantages in accordance with the present invention are provided by a receiver that removes some or all of the extraneous signals from a received aggregate before they are processed by the symbol decoding function. The effective signal to interferer ratio is therefore reduced, allowing for a lower error correcting allowance to the link.

Instead of just trying to extract the desired signal, the decoder will examine a number of the spread spectrum signals:

$x = As + n.$

The s vector is made up of all the signals that the receiver has spread spectrum code use knowledge. This could be either because the receiver knows which codes are in use (e.g., control channels, multiple data channels in use by the device), is informed which codes are in use by the network, has searched the code space and found them, or a combination of these possibilities.

Any remaining coded signals not in the set are treated as noise and are included in n. In some cases the number of interferers to be removed may be less than the set of available codes. This would be possible if it was found that certain codes produced interferer components sufficiently low to not be a significant contributor to the error rate. Another reason would be an excessive time required to process the aggregate if all the known codes were included. As before, any codes not included in the creation of s would appear as an additional noise component presented to the symbol decoder.

Upon examining the individual received signals, it can be seen that they are linear sums of all the transmitted signal streams. The matrix equation for all of the signals can be re-written as $y = Wx = WAs + Wn = WAs + n'.$ The mixing matrix is formed based upon the combined signals from each receiver, with entries on a diagonal of the mixing matrix corresponding to the desired signals and entries adjacent the diagonal corresponding to the undesired signals. The mixing matrix is processed so that a level of the desired signals increases and a level of the undesired signals decreases.

Processing of the mixing matrix may be based on a knowledge based signal processing, such as a zero forcing (ZF) process or a minimum mean squared estimation (MMSE) process. Alternatively, the mixing matrix signal processing may be based on a blind signal separation process. Three commonly used techniques that fall under blind signal separation are principal component analysis (PCA), independent component analysis (ICA), and singular value decomposition (SVD). A key factor is that the signal processing is not performing classical signal separation, as the desired signal for each row is already known. Instead, the signal processing is cleaning up the separated signals in each channel. The actual signal separation is performed in the receivers based upon de-spreading codes.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notations are used to indicate similar elements in alternative embodiments.

Figure 1:
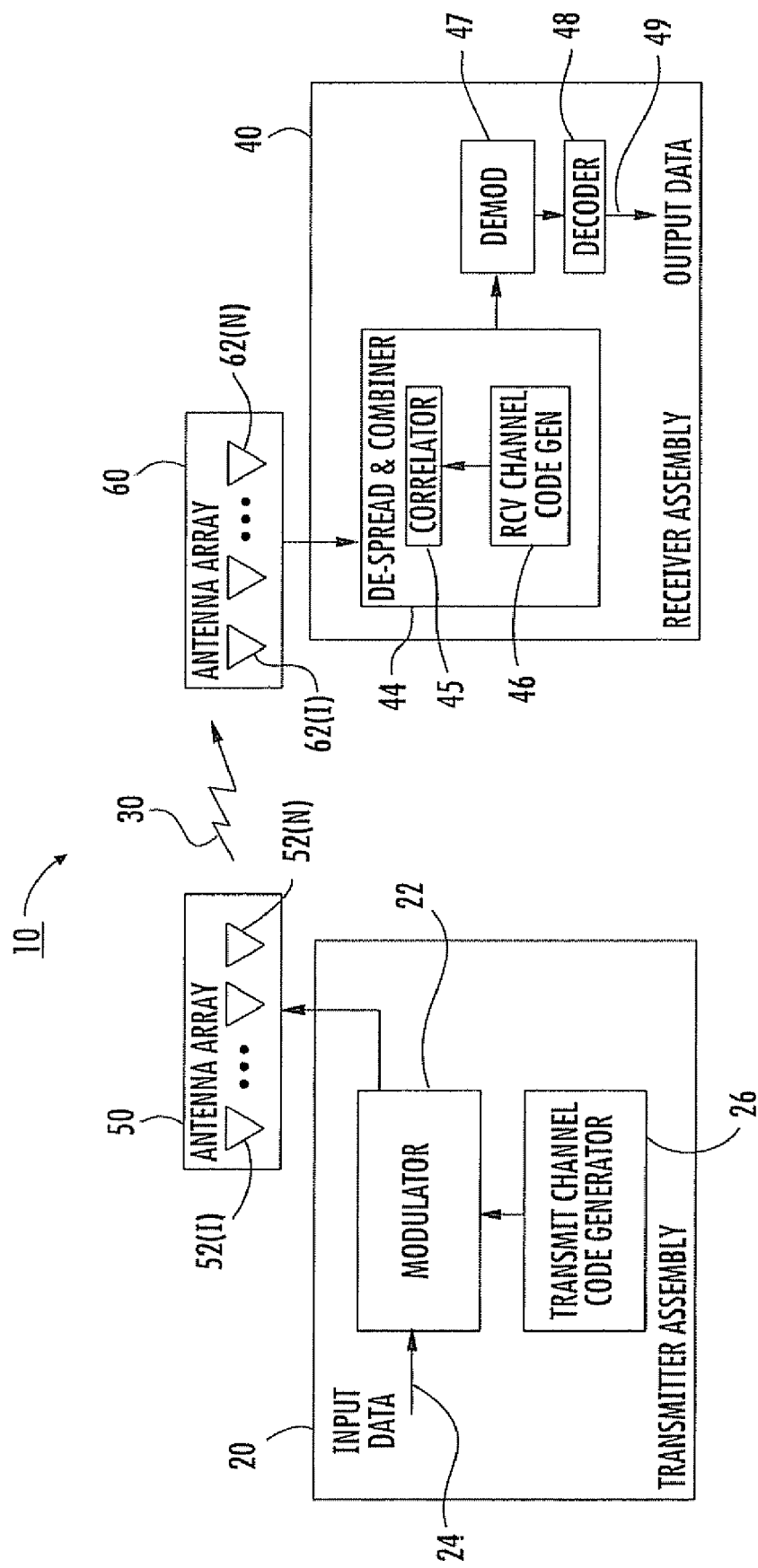
FIG. 1 is a block diagram of a spread spectrum communications system in accordance with the present invention.

A simplified block diagram of a spread-spectrum communications system 10 will initially be discussed in reference to FIG. 1. The communications system 10 includes a spread spectrum transmitter assembly 20 and a spread spectrum receiver assembly 40. In the transmitter assembly 20, a modulator 22 receives input data 24 and a channel code.

The channel code is provided by a channel code transmit generator 26 and is unique for each channel. The channel code runs at a much higher rate than a data rate of the input data so that the modulated spread-spectrum output signal 30 occupies a much greater bandwidth than the signal's baseband information bandwidth.

The spread-spectrum output signal 30 is transmitted via an antenna array 50 coupled to the transmitter assembly 20, and is received by an antenna array 60 coupled to the receiver assembly 40. The antenna arrays 50, 60 are not limited to any particular configuration, and may include one or more antenna elements 52(1)-52(N) in the transmit array and one or more antenna elements in the receive array 62(1)-62(N). Although the number of antenna elements in the arrays 50, 60 is shown to be equal in number, they may be different depending on a particular implementation.

In addition to receiving the desired spread spectrum signal 30, undesired signals are also received. The undesired signals may be a result of channel distortion and timing imperfections causing intermixing, which in turn decreases the orthogonality of the signals.

A de-spread and combiner block 44 in the receiver assembly 40 determines the desired spread spectrum signal for demodulation by a demodulator 47. The de-spread and combiner block 44 includes a correlator 45 and a receive channel code generator 46 for generating a channel code. The channel codes generated by the respective transmit and receive channel code generators 26, 46 are identical. After demodulation, the desired signals are decoded by a decoder 48 to generate output data 49.

Figure 2:
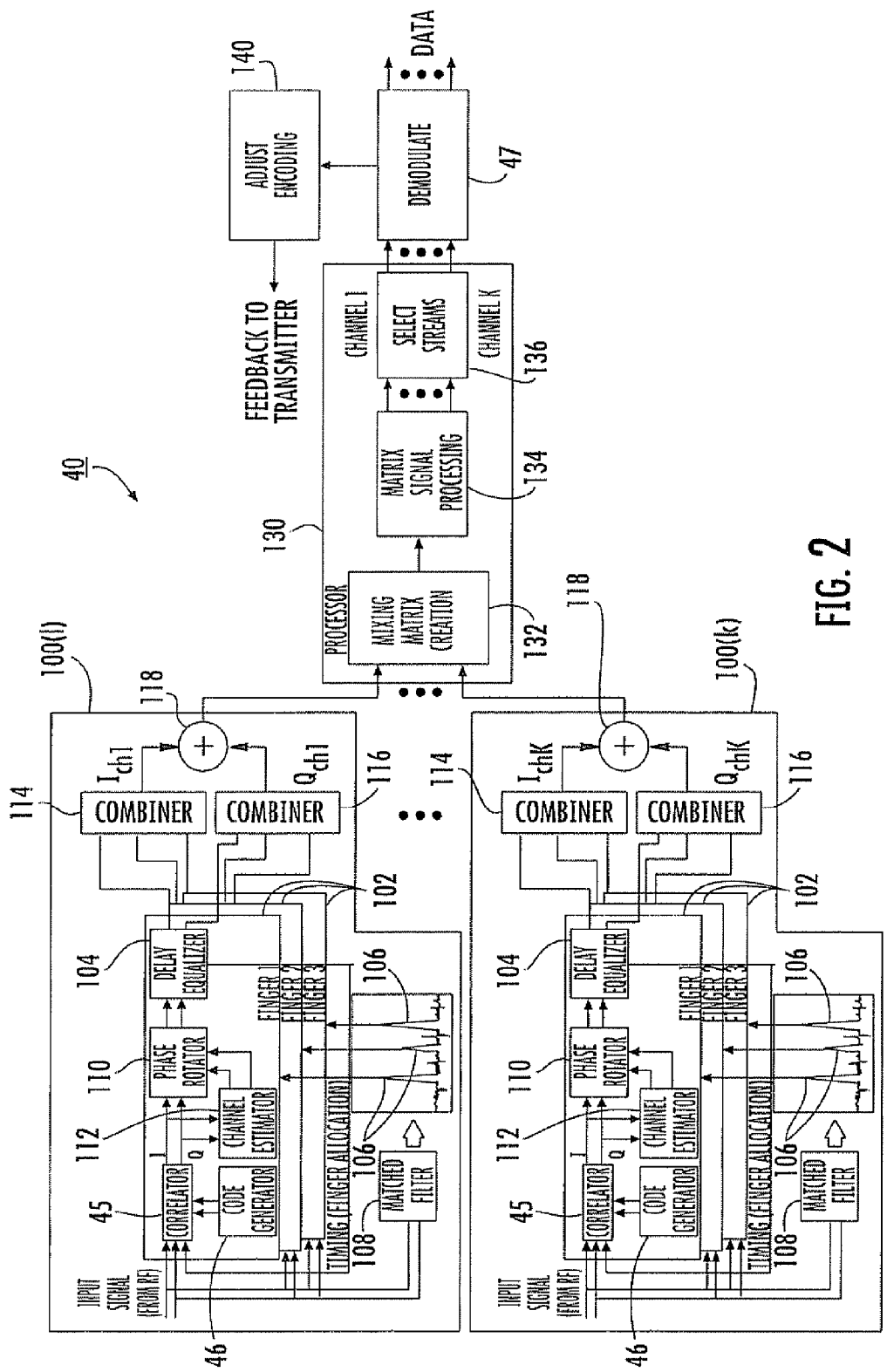
FIG. 2 is a more detailed block diagram of the receive side of the spread spectrum communications system shown in FIG. 1.

A more detailed block diagram of the receiver assembly 40 is provided in FIG. 2. The illustrated receiver assembly 40 comprises a plurality of Rake receivers 100(1)-100(k), with each Rake receiver comprising f fingers 102 for selecting f different multipath components of the received desired and undesired signals. A Rake receiver will be generally referred to by reference 100. In the illustrated embodiment, f=3 for each Rake receiver 100, although the actual number of fingers 102 may vary, and they may be different in each instance within the same overall receiver structure. In lieu of Rake receivers 100, standard receivers may be used.

For each Rake receiver 100, each finger 102 comprises a correlator 45 coupled to a channel code generator 46. The channel code generator 46 generates a channel code delayed by different time frames as determined by a delay equalizer 104. As part of the correlation process, the receive channel code is delayed by 1 chip slice in order to find a match with the corresponding transmit channel code in the received signals.

When a peak 106 is provided in the output of the matched filter 108, the correlator 45 has found a match in terms of identifying the desired signal. Each Rake receiver 100 has a unique channel code as compared to the channel codes in the other Rake receivers. Each channel code corresponds to a different channel. For instance, there may be one or more voice channels, and one or more data channels.

The output of the correlator 45 is broken down into I and Q components. Although this is not necessary, the I and Q components provide increased resolution for the desired and undesired signals. The I and Q components from the correlator 45 are then provided to a phase rotator 110. A channel estimator 112 also provides an estimate of the channel to the phase rotator 110.

During reception by the Rake receiver 100, the I and Q components rotate in the frequency spectrum. The I and Q components are raw data, and even though the raw data may be unknown, the phase rotator 110 rotates the raw data back to the location before their rotation. The rotation is based upon a known training sequence in the data.

The output of the phase rotator 110 is provided to the delay equalizer 104. In each Rake receiver 100, there are three different delays, one for each finger 102. The delay equalizer 104 determines what the delay is among the signals from each finger 102. Once the respective delays are determined, the signals can be adjusted accordingly so that they may be combined.

Still part of the Rake receiver 100, the I and Q components from each finger 102 are combined. The I components are combined by a combiner 114 to generate a combined I component. Likewise, the Q components are combined by a different combiner 116 to generate a combined Q component. The I and Q components are the added together by an adder 118.

This process is repeated for each Rake receiver 100. The output from each adder 118 is provided to a signal processor 130. The signal processor 130 includes a mixing matrix module 132. The mixing matrix module 132 populates a mixing matrix based upon the combined signals provided by each Rake receiver 100. Each row of the mixing matrix has a dominant signal and one or more non-dominate signals. The non-dominate signals are the undesired or noise signals. The dominant signal in each row corresponds to the desired signal for that particular channel.

A mixing matrix signal processing module 134 processes the mixing matrix so that a level of the desired signal term increases and a level of the undesired signal terms decreases in each row of the matrix. In other words, the noise floor of the mixing matrix is decreased by moving energy from the off-diagonals to the diagonals. The desired signals for demodulation are then selected by a select streams module 136. Channels 1 through channel K may be selected for demodulation.

The mixing matrix module 132, the mixing matrix signal processing module 134 and the select streams module 136 may all be implemented in the signal processor 130, as illustrated. A key factor is that the processor 130 is not performing classical signal separation, as the desired signal for each row is already known. Instead, the signal processor is cleaning up the separated signals in each channel. The actual signal separation is performed in the Rake receivers 100 based upon de-spreading codes.

Without the signal processor 130, the received signals would generally require a greater amount of error correcting codes to overcome the noise levels of the undesired signals. Individually none of the interferers may be significant, but in aggregate, they degrade the signal-to-noise ratio of the desired signals significantly. Consequently, a greater amount of error correcting codes are transmitted in the desired signals, which in turn, lowers the overall effective data rate.

The mixing matrix signal processing may be based on a knowledge based signal processing, such as a zero forcing (ZF) process or a minimum mean squared estimation (MMSE) process. Alternatively, the mixing matrix signal processing may be based on a blind signal separation process. Three commonly used techniques that fall under blind signal separation are principal component analysis (PCA), independent component analysis (ICA), and singular value decomposition (SVD).

As long as the desired and undesired signals received by the antenna array 60 coupled to the Rake receiver 100 are independent in some measurable characteristic, and if their signal sums are linearly independent from each other, one or more of these signal processing techniques may be used to enhance the desired signals from a mixture of the desired and undesired signals. The measurable characteristic is often some combination of the first, second, third or fourth moments of the signals.

Based upon the signals selected by the select streams module 136, the demodulator 47 demodulates the selected desired signals. The output of the demodulator 47 also provides information to an adjust encoding module 140. The adjust encoding module 140 provides feedback back to the transmitter 20. The transmitter 20 will adjust the amount of error correcting codes being transmitted to the receiver. If the signal processor 130 is improving the signal-to-noise ratios in the mixing matrix, then the transmitter 20 can reduce the amount of error correcting codes being transmitted to the receiver 40 as part of the desired data. This in turn increases the effective overall data rate of the desired signals. Alternately or in combination, the transmitter could change the spreading factor, the data rate, modulation constellation or any other means associated with the robustness of the signal stream's ultimate decoding.

The rank of the mixing matrix for the receiver assembly 40 illustrated in FIG. 2 is less than or equal to the number of channel codes. For k Rake receivers, there are k channels, which each channel having a unique channel code.

Figure 3:
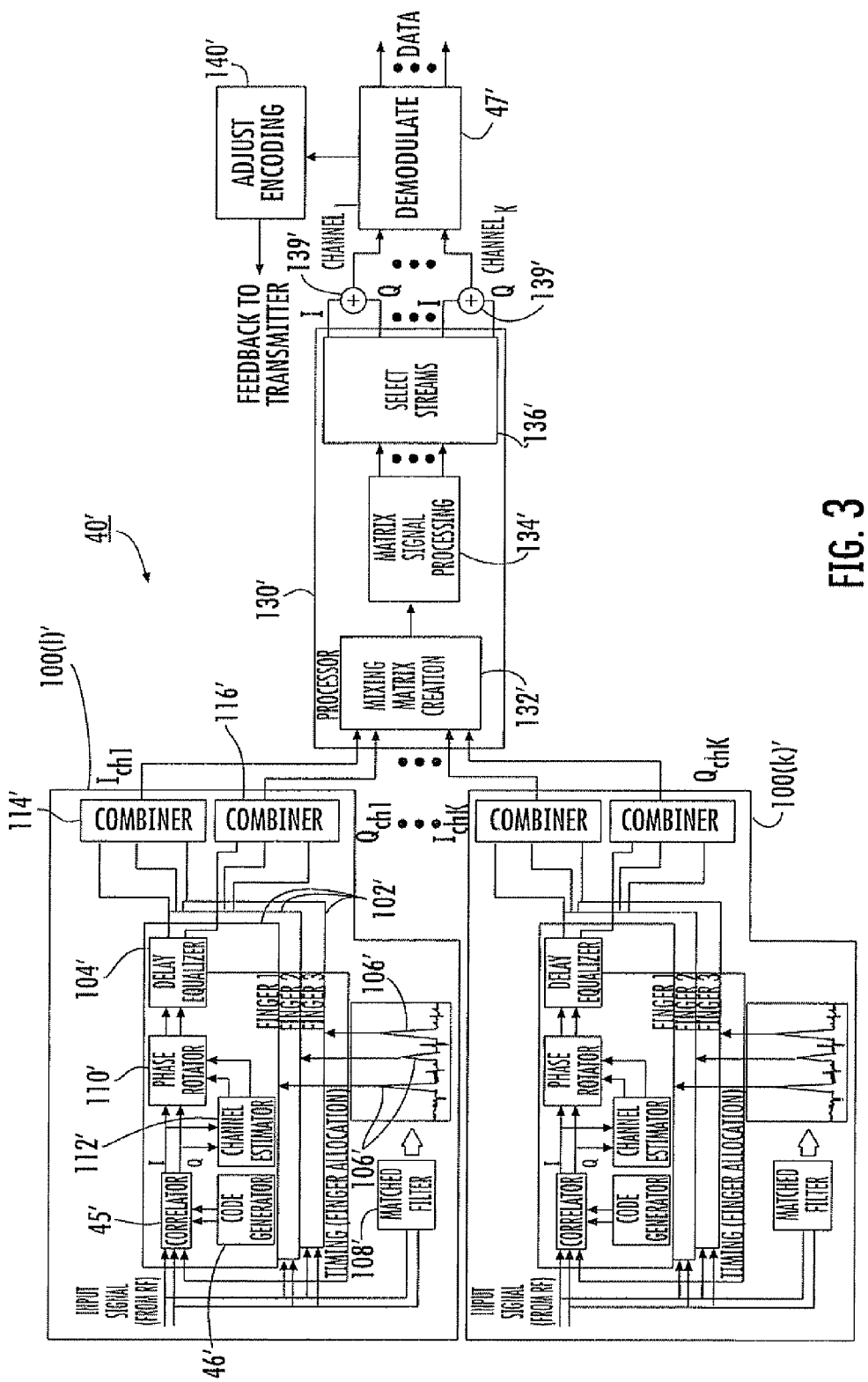
FIG. 3 is a more detailed block diagram of another embodiment of the receive side of the spread spectrum communications system shown in FIG. 1.

Another embodiment of the receiver assembly 40' is illustrated in FIG. 3. The respective combiners 114', 116' for each Rake receiver 100' have been modified so that the combined I and Q components of the desired and undesired signals are not added together by the adder 118 shown in FIG. 2. Instead, the combined I components and the combined Q components are treated as separate entries into the mixing matrix module 132' for populating the mixing matrix. As a result, the rank of the mixing matrix is less than or equal to 2 times the number of channel codes.

In addition, the output of the select streams module 136' adds the I and Q components together via a respective adder 139' for each channel for the selected channels before the demodulation is performed by the demodulator 47'.

Figure 4:
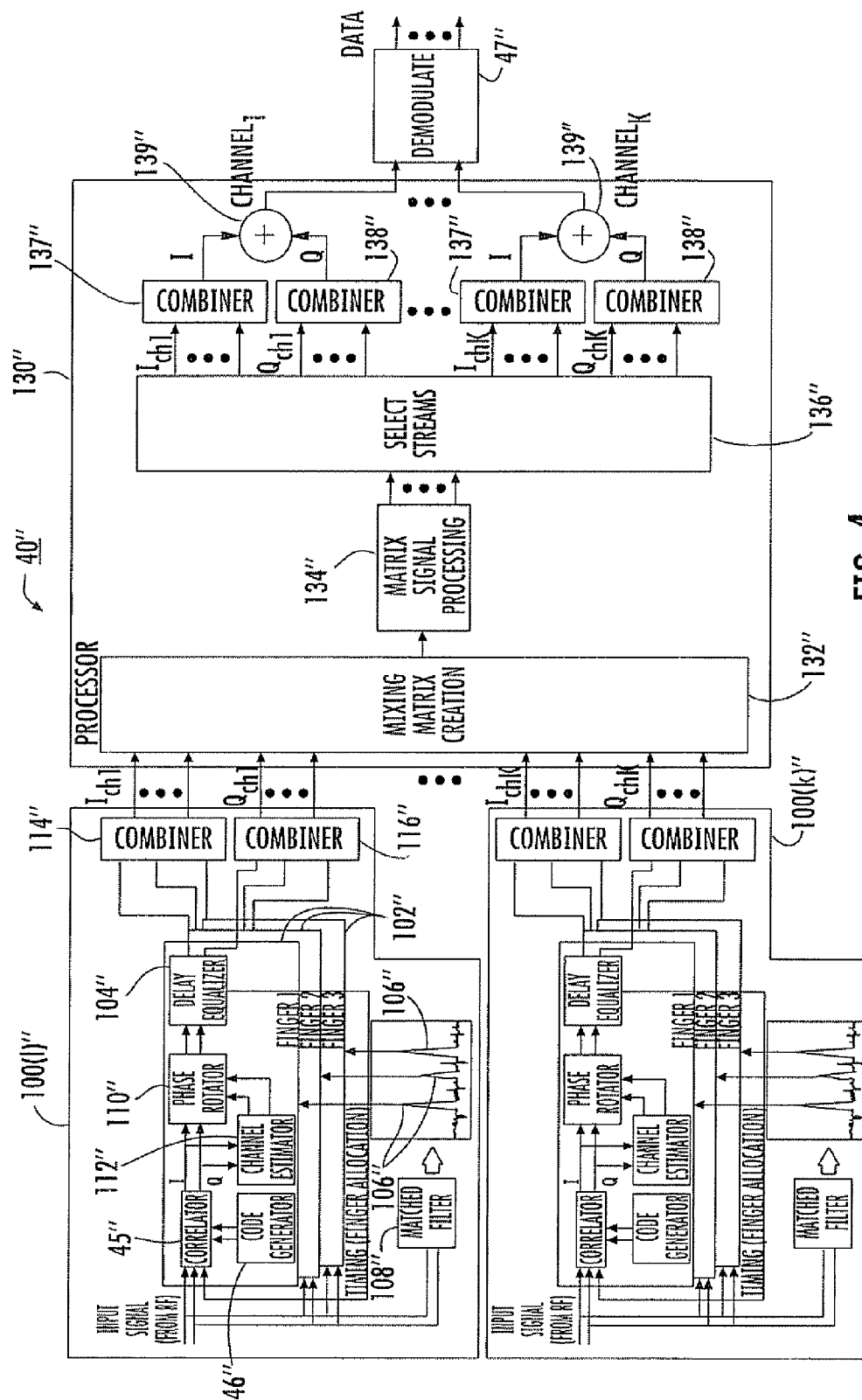
FIG. 4 is a more detailed block diagram of yet another embodiment of the receive side of the spread spectrum communications system shown in FIG. 1.

Yet another embodiment of the receiver assembly 40" is illustrated in FIG. 4. This embodiment is similar to the receiver assembly 40' illustrated in FIG. 3, except the respective combiners 114", 116" for each Rake receiver 100" have been modified so that the outputs therefrom are based upon the I and Q components provided by each finger 102". As a result, the rank of the mixing matrix is less than or equal to 2 times the number of fingers f times the number of channel codes.

In other words, all of the I and Q components are kept separate for populating the mixing matrix. If all the desired and undesired signals came in robustly, the mixing matrix module 132' can easily build the mixing matrix. In an actual environment, some of the I and Q components are better off being combined. Consequently, the number of I or Q values from the selective combiners 114" and 116" may actually collapse to one for either or both I and Q.

In addition, the output of the select streams module 136" provides the I and Q components to a respective combiner 137", 138" for each channel. Each channel has an adder 139" for adding the I and Q components for each channel associated therewith prior to demodulation by the demodulator 47".

As discussed in great detail in U.S. patent application Ser. No. 11/232,500, which is assigned to the current assignee of the present invention and is incorporated herein by reference in its entirety, different techniques may be used to increase the rank of the mixing matrix. These techniques include different antenna array configurations for generating more than one antenna pattern for receiving different summations of the desired and undesired signals. Other techniques include adding or replacing summations of the desired and undesired signals to further populate the mixing matrix. These techniques will be discussed with reference to FIGS. 5 and 6.

There are a number of different embodiments of the receive antenna array 60. The N antenna elements 62 may be correlated for forming a phased array. In another embodiment, the N antenna elements 62 may comprise at least one active antenna element and up to N−1 passive antenna elements for forming a switched beam antenna. In addition, at least two of the N antenna elements may be correlated with different polarizations.

The receive antenna array 60 may thus have a multiplier effect on the received different summations of the desired and undesired signals. By increasing the rank of the mixing matrix, the desired signals have a greater chance of being enhanced by the signal processor 130.

The other techniques that will now be discussed advantageously allows the rank of the mixing matrix to be further increased without having to increase the number of N antenna elements 62 in the receive antenna array 60.

A multiplier effect on the number of received different summations of the desired and undesired signals may be accomplished using one or a combination of the following. Array deflection involves changing the elevation of the antenna patterns for receiving additional summations of the desired and undesired signals. Path selection may be performed so that all of the summations of the desired and undesired signals used to populate the mixing matrix are correlated and/or statistically independent.

Figure 5:
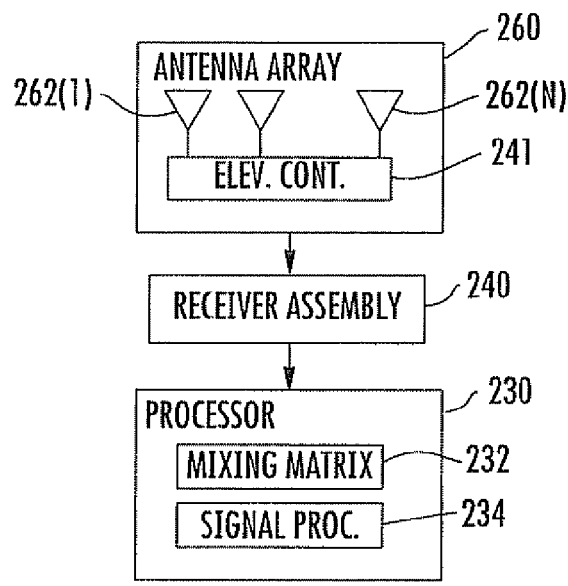
FIG. 5 is a block diagram of the receive side of a spread spectrum communications system operating based upon array deflection for providing different summations of desired and undesired signals for signal processing in accordance with the present invention.

A block diagram of the receive side of the spread spectrum communications system 10 operating based upon array deflection for providing different summations of desired and undesired signals for signal processing is provided in FIG. 5.

The receive antenna array 260 comprises N antenna elements 262 for generating N initial antenna patterns for receiving N different summations of the desired and undesired signals. The receive antenna array 260 also comprises an elevation controller 241 for selectively changing an elevation of at least one of the N initial antenna patterns for generating at least one additional antenna pattern so that at least one additional different summation of the desired and undesired source signals is received thereby.

The mixing matrix has a rank less than or equal to N times the number of channel codes plus the number of additional different summations of the desired and undesired signals received using the additional antenna patterns.

Figure 6:
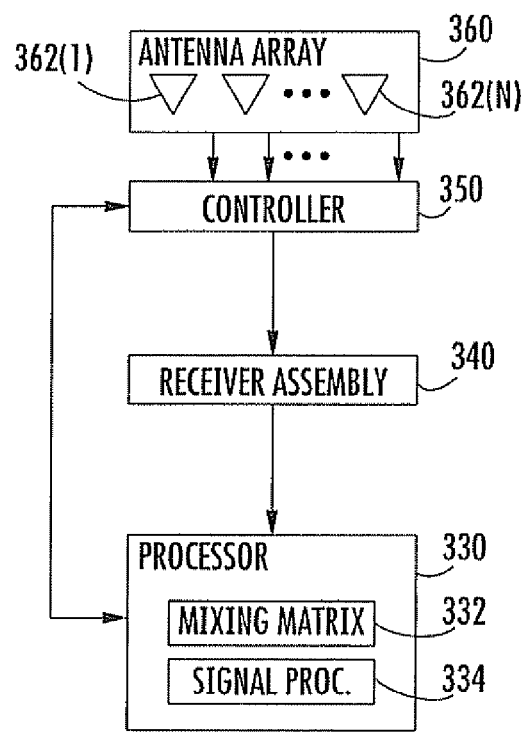
FIG. 6 is a block diagram of the receive side of a spread spectrum communications system operating based upon path selection for providing different summations of desired and undesired signals for signal processing in accordance with the present invention.

A block diagram of the receive side of the spread spectrum communications system 10 operating based upon path selection for providing different summations of desired and undesired signals for signal processing is provided in FIG. 6.

The receive antenna array 360 comprises N elements 363 for forming at least N antenna beams for receiving at least N different summations of the desired and undesired signals, with N being greater than 2. A controller 350 is connected to the antenna array 360 for selectively forming the at least N antenna beams.

The signal processor 330 also determines if the different summations of the desired and undesired signals are correlated or statistically independent, and if not, then cooperates with the controller 350 for forming different antenna beams for receiving new different summations of the desired and undesired signals to replace the different summations of the desired and undesired signals that are not correlated or statistically independent in the mixing matrix.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A spread spectrum communications system comprising:
    an antenna array comprising N antenna elements for receiving different summations of desired and undesired signals, where $N \geq 2$;
    a plurality of receivers, each receiver coupled to said same antenna array and operating based upon a respective channel code for
        de-spreading the desired and undesired signals for determining at least one desired signal associated with the respective channel code, and
        combining the at least one desired signal and the undesired signals after the de-spreading;
    a processor coupled to said plurality of receivers for
        forming a mixing matrix based upon the combined signals from each receiver, with entries on a diagonal of the mixing matrix corresponding to the desired signals and entries adjacent the diagonal corresponding to the undesired signals, and
        processing the mixing matrix so that a level of the desired signals increases and a level of the undesired signals decreases; and
    a demodulator coupled to said processor for demodulating at least one desired signal and determining an error rate of the at least one desired signal after demodulation, the error rate being used as feedback to a transmitter transmitting the at least one desired signal so that characteristics in new transmitted signals can be adjusted based upon the determined error rate.

2. A spread spectrum communications system according to claim 1 wherein there are X channel codes associated with said plurality of receivers; and wherein a rank of the mixing matrix is $\leq X$, where $X \geq 2$.

3. A spread spectrum communications system according to claim 1 wherein in each receiver, the de-spreading comprises separating the at least one desired signal and the undesired signals into I and Q components, and the combining comprises adding the I and Q components together before the mixing matrix is formed.

4. A spread spectrum communications system according to claim 1 wherein the characteristics in the new transmitted signals to be adjusted comprise at least one of error detection encoding, data rate, modulation type and spread factor.

5. A spread spectrum communications system according to claim 1 wherein there are X channel codes associated with said plurality of receivers; wherein $N \geq 2$ so that each antenna element in said antenna array provides at least one linear summation of the desired and undesired signals to said plurality of receivers so that a rank of the mixing matrix $\leq N*X$.

6. A spread spectrum communications system according to claim 1 wherein said N antenna elements comprise N active antenna elements so that said antenna array forms a phased array.

7. A spread spectrum communications system according to claim 1 wherein said N antenna elements comprise at least one active antenna element and up to N−1 passive antenna elements for forming a switched beam antenna.

8. A spread spectrum communications system according to claim 1 wherein said N antenna elements comprise at least two correlated antenna elements having different polarizations.

9. A spread spectrum communications system according to claim 1 wherein there are X channel codes associated with said plurality of receivers;
    wherein said antenna array generates N initial antenna patterns for receiving N different summations of the desired and undesired signals, said antenna array comprising an elevation controller for selectively changing an elevation of at least one of the N initial antenna patterns for generating at least one additional antenna pattern so that at least one additional different summation of the desired and undesired signals is received thereby;
    the mixing matrix having a rank $\leq N*X$+the number of additional different summations of the desired and undesired signals received using the additional antenna patterns.

10. A spread spectrum communications system according to claim 1 wherein said antenna array forms at least N antenna beams for receiving at least N different summations of the desired and undesired signals, with N being greater than 2; further comprising a controller coupled to said antenna array for selectively forming the at least N antenna beams; and wherein said processor also
    determining if the different summations of the desired and undesired signals are correlated or statistically independent, and if not, then
    cooperating with said controller for forming different antenna beams for receiving new different summations of the desired and undesired signals to replace the different summations of the desired and undesired signals that are not correlated or statistically independent in the mixing matrix.

11. A spread spectrum communications system according to claim 1 wherein said processor processes the mixing matrix based on at least one of principal component analysis (PCA), independent component analysis (ICA), and single value decomposition (SVD).

12. A spread spectrum communications system according to claim 1 wherein said processor processes the mixing matrix based on at least one of a zero forcing (ZF) process, and a minimum mean squared estimation (MMSE) process.

13. A spread spectrum communications system comprising:
an antenna array comprising N antenna elements for receiving desired and undesired signals, where $N \geq 2$;
at least one Rake receiver coupled to said antenna array and comprising up to f fingers for selecting up to f different multipath components of the received desired and undesired signals, where f>2, each Rake receiver operating based upon a respective channel code so that each finger performs the following
de-spreading the desired and undesired signals for determining at least one desired signal associated with the respective channel code, and
separating the at least one desired signal and the undesired signals into I and Q components;
a processor coupled to said at least one Rake receiver for
forming a mixing matrix based upon the I and Q components, with entries on a diagonal of the mixing matrix corresponding to the I and Q components of the desired signals and entries adjacent the diagonal corresponding to the I and Q components of the undesired signals,
processing the mixing matrix so that a level of the I and Q components of the desired signals increases and a level of the I and Q components of the undesired signals decreases, with the processing being based on at least one of principal component analysis (PCA), independent component analysis (ICA), single value decomposition (SVD), a zero forcing (ZF) process, and a minimum mean squared estimation (MMSE) process, and
combining the I and Q components for at least one desired signal; and
a demodulator coupled to said processor for demodulating the at least one desired signal.

14. A spread spectrum communications system according to claim 13 wherein there are X channel codes associated with said at least one Rake receiver, where $X \geq 1$; wherein the respective I components from said f fingers in each Rake receiver are combined after the de-spreading into a single I component, and the respective Q components from said f fingers in each Rake receiver are combined after the de-spreading into a single Q component; and wherein a wherein a rank of the mixing matrix is $\leq 2*X$.

15. A spread spectrum communications system according to claim 13 wherein there are X channel codes associated with said at least one Rake receiver, where $X \geq 1$; wherein the respective I components from said f fingers in each Rake receiver are each provided to said processor for separate entries into the mixing matrix, and the respective Q components from said f fingers in each Rake receiver are provided to said processor for respective entries into the mixing matrix; and
wherein a wherein a rank of the mixing matrix is $\leq 2*f*X$.

16. A spread spectrum communications system according to claim 13 wherein said demodulator determines an error rate of the at least one desired signal after demodulation, the error rate to be used as feedback to a transmitter transmitting the at least one desired signal so that characteristics in new transmitted signals can be adjusted based upon the determined error rate.

17. A spread spectrum communications system according to claim 16 wherein the characteristics in the new transmitted signals to be adjusted comprise at least one of error detection encoding, data rate, modulation type and spread factor.

18. A spread spectrum communications system according to claim 13 wherein there are X channel codes associated with said at least one Rake receiver; wherein $N \geq 2$ so that each antenna element in said antenna array provides at least one linear summation of the desired and undesired signals to said at least one Rake receiver so that a rank of the mixing matrix $\leq N+X$.

19. A spread spectrum communications system according to claim 13 wherein said N antenna elements comprise N active antenna elements so that said antenna array forms a phased array.

20. A spread spectrum communications system according to claim 13 wherein said N antenna elements comprise at least one active antenna element and up to N−1 passive antenna elements for forming a switched beam antenna.

21. A spread spectrum communications system according to claim 13 wherein said N antenna elements comprise at least two correlated antenna elements having different polarizations.

22. A spread spectrum communications system according to claim 13 wherein there are X channel codes associated with said at least one Rake receiver;
wherein said antenna array generates N initial antenna patterns for receiving N different summations of the desired and undesired signals, said antenna array comprising an elevation controller for selectively changing an elevation of at least one of the N initial antenna patterns for generating at least one additional antenna pattern so that at least one additional different summation of the desired and undesired signals is received thereby;
the mixing matrix having a rank $\leq N*X+$the number of additional different summations of the desired and undesired signals received using the additional antenna patterns.

23. A spread spectrum communications system according to claim 13 wherein said antenna array forms at least N antenna beams for receiving at least N different summations of the desired and undesired signals, with N being greater than 2, said antenna array comprising a controller for selectively forming the at least N antenna beams; and wherein said processor also
determining if the different summations of the desired and undesired signals are correlated or statistically independent, and if not, then cooperating with said controller for forming different antenna beams for receiving new different summations of the desired and undesired signals to replace the different summations of the desired and undesired signals that are not correlated or statistically independent in the mixing matrix.

24. A spread spectrum communications system comprising:
an antenna array comprising N antenna elements for receiving different summations of desired and undesired signals, where $N \geq 2$;

a plurality of receivers, each receiver coupled to said same antenna array and operating based upon a respective channel code for
- de-spreading the desired and undesired signals for determining at least one desired signal associated with the respective channel code, and
- combining the at least one desired signal and the undesired signals after the de-spreading;

a processor coupled to said plurality of receivers for
- forming a mixing matrix based upon the combined signals from each receiver, with entries on a diagonal of the mixing matrix corresponding to the desired signals and entries adjacent the diagonal corresponding to the undesired signals, and
- processing the mixing matrix so that a level of the desired signals increases and a level of the undesired signals decreases, with the processing being based on at least one of principal component analysis (PCA), independent component analysis (ICA), single value decomposition (SVD), a zero forcing (ZF) process, and a minimum mean squared estimation (MMSE) processor; and a demodulator coupled to said processor for demodulating at least one desired signal.

25. A spread spectrum communications system according to claim 24 wherein there are X channel codes associated with said plurality of receivers; and
wherein a rank of the mixing matrix is <X, where X>2.

26. A spread spectrum communications system according to claim 24 wherein in each receiver, the de-spreading comprises separating the at least one desired signal and the undesired signals into I and Q components, and the combining comprises adding the I and Q components together before the mixing matrix is formed.

27. A spread spectrum communications system according to claim 24 wherein said demodulator determines an error rate of the at least one desired signal after demodulation, the error rate to be used as feedback to a transmitter transmitting the at least one desired signal so that characteristics in new transmitted signals can be adjusted based upon the determined error rate.

28. A spread spectrum communications system according to claim 27 wherein the characteristics in the new transmitted signals to be adjusted comprise at least one of error detection encoding, data rate, modulation type and spread factor.

29. A spread spectrum communications system according to claim 24 wherein there are X channel codes associated with said plurality of receivers; wherein $N \geq 2$ so that each antenna element in said antenna array provides at least one linear summation of the desired and undesired signals to said plurality of receivers so that a rank of the mixing matrix $\leq N*X$.

30. A spread spectrum communications system according to claim 24 wherein there are X channel codes associated with said plurality of receivers;
wherein said antenna array generates N initial antenna patterns for receiving N different summations of the desired and undesired signals, said antenna array comprising, an elevation controller for selectively changing an elevation of at least one of the N initial antenna patterns for generating at least one additional antenna pattern so that at least one additional different summation of the desired and undesired signals is received thereby;
the mixing matrix having a rank $\leq N*X+$ the number of additional different summations of the desired and undesired signals received using the additional antenna patterns.

31. A spread spectrum communications system according to claim 24 wherein said antenna array forms at least N antenna beams for receiving at least N different summations of the desired and undesired signals, with N being greater than 2; further comprising a controller coupled to said antenna array for selectively forming the at least N antenna beams; and wherein said processor also determining if the different summations of the desired and undesired signals are correlated or statistically independent, and if not, then
cooperating with said controller for forming different antenna beams for receiving new different summations of the desired and undesired signals to replace the different summations of the desired and undesired signals that are not correlated or statistically independent in the mixing matrix.

* * * * *